No. 837,658. PATENTED DEC. 4, 1906.
G. L. BAYLEY.
FILTERING APPARATUS.
APPLICATION FILED MAY 4, 1906.
2 SHEETS—SHEET 1.
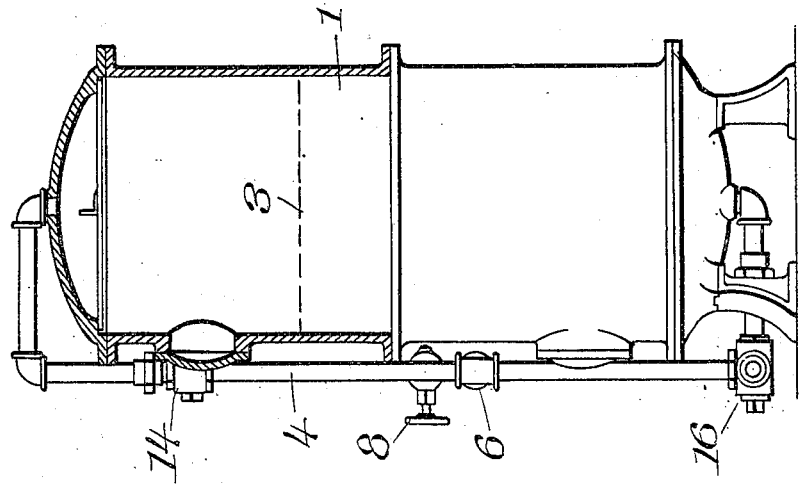
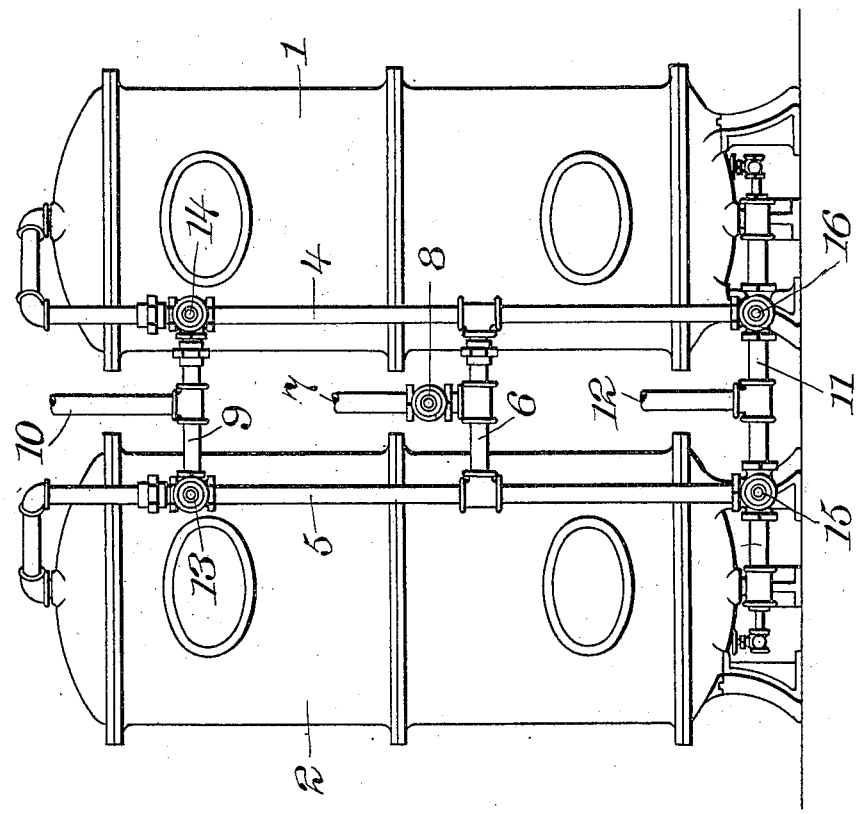

No. 837,658. PATENTED DEC. 4, 1906.
G. L. BAYLEY.
FILTERING APPARATUS.
APPLICATION FILED MAY 4, 1906.
2 SHEETS—SHEET 2.
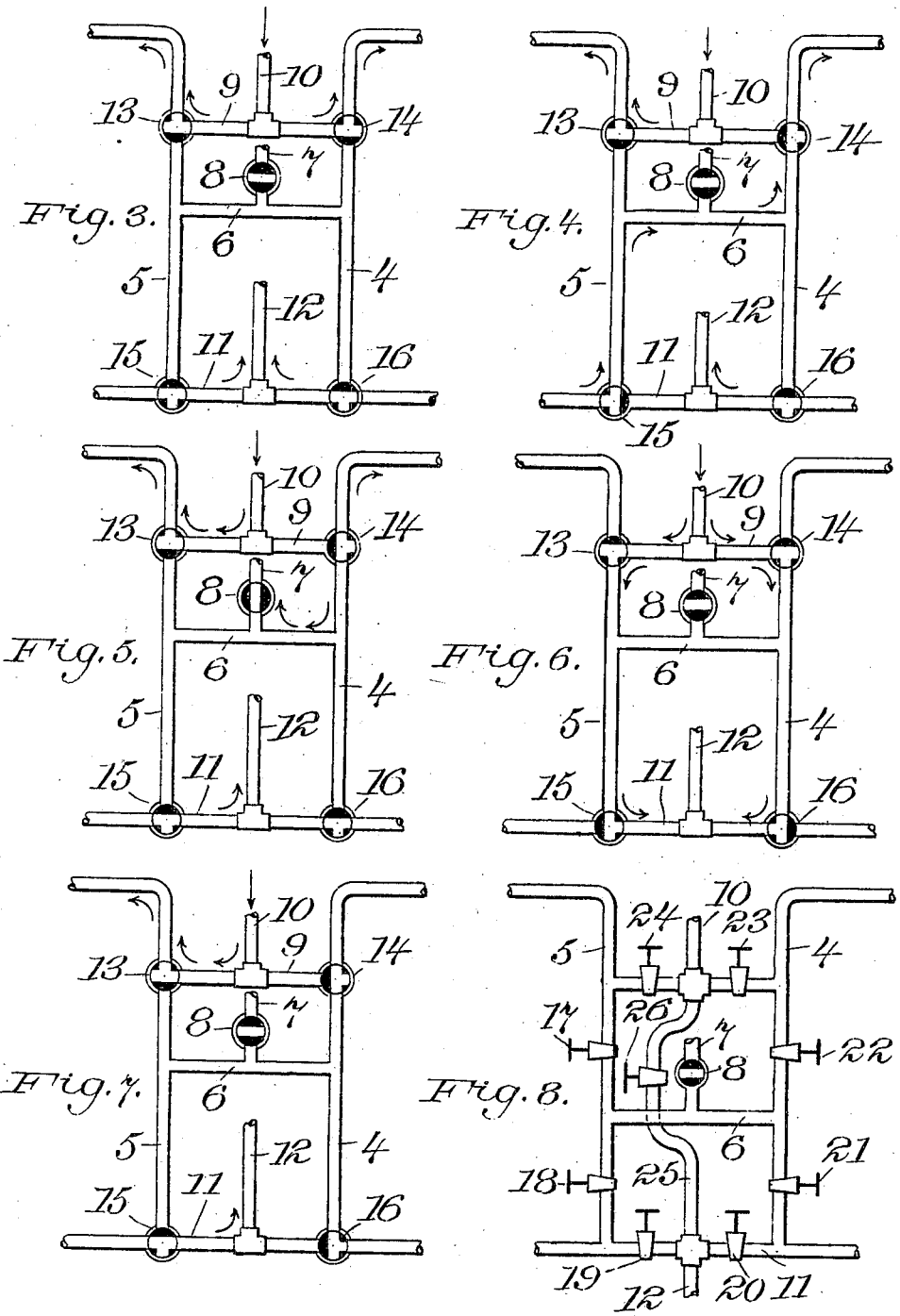

UNITED STATES PATENT OFFICE.

GUY L. BAYLEY, OF PITTSBURG, PENNSYLVANIA, ASSIGNOR TO THE CUMMINGS FILTER CO., A CORPORATION OF WEST VIRGINIA.

FILTERING APPARATUS.

No. 837,658.      Specification of Letters Patent.      Patented Dec. 4, 1906.

Application filed May 4, 1906. Serial No. 315,169.

*To all whom it may concern:*

Be it known that I, GUY L. BAYLEY, a citizen of the United States of America, and a resident of Pittsburg, county of Allegheny, State of Pennsylvania, have invented certain new and useful Improvements in Filtering Apparatus, of which the following is a specification.

My invention relates to filtering apparatus, and more specifically consists of certain improvements in the class of pressure-filters such as is illustrated in Patent No. 522,407, granted July 3, 1894, to S. B. Cummings and D. W. Field.

In apparatus of the kind disclosed in the above-mentioned patent provision is made for operating either of the filtering-tanks individually—that is to say, causing the fluid to be filtered to pass only through that tank; but in the patented apparatus the other filtering vessel or tank, although not in use, is still connected with the hydraulic system and is under a hydrostatic pressure, although the fluid in said second tank is not in motion. In the same way provision is made in the patented apparatus for passing the fluid direct from the supply connection to the delivery connection without passing it through either filtering vessel; but in this case also said filtering vessels are both connected to the hydraulic system and are under hydrostatic pressure. This evidently renders it impossible to completely cut off either or both filtering vessels from the hydraulic system in case of a leak occurring or if for any other reason either or both of said vessels requires opening for purposes of repair or renewal of its contents. I have invented an arrangement of connections which overcomes this difficulty and has other advantages.

The best forms of apparatus embodying my invention at present known to me are illustrated in the accompanying two sheets of drawings, in which—

Figure 1 is a front elevation of an apparatus embodying my invention. Fig. 2 is a side elevation and partial section of the same. Figs. 3, 4, 5, 6, and 7 are diagrammatic representations of different arrangements of the valves, and Fig. 8 represents a modification.

Throughout the drawings like reference-figures indicate like parts.

1 represents the right-hand tank or filtering vessel, 2 the left-hand tank or filtering vessel as the same are shown in Fig. 1. Each of these tanks has a bed of filtering material (represented at 3 in Fig. 2,) or some other equivalent form of filtering medium.

4 is a shunt-pipe connecting the upper and lower portions of tank 1, thereby forming a by-pass around the diaphragm 3, and 5 is a similar shunt-pipe on tank 2. These shunt-pipes are connected by three bridging pipes or connections. The middle one, 6, has a waste-discharge connection 7 controlled by the valve 8. To the upper bridging-pipe 9 is connected the supply-pipe 10, and to the lower bridging-pipe 11 is connected the delivery-pipe 12. At the junction of the two outside bridging-pipes 9 and 11 with the shunt-pipes 4 and 5 in the form shown in Fig. 1 are located the three-way cocks 13, 14, 15, and 16.

In the modified arrangement shown in Fig. 8 the shunt-pipes 4 and 5 and the bridging connections 6, 9, and 11 are retained; but the functions of the three-way cocks 13, 14, 15, and 16 are performed by the gate-valves 17, 18, 19, 20, 21, 22, 23, and 24. This form of apparatus is designed for use in larger sizes of filters in which the construction of large three-way cocks and their maintenance in fluid-tight condition might be difficult. This modification also requires the employment of a separate by-pass 25 connecting the supply-main 10 with the delivery-main 12 and controlled by the valve 26 for use in case it becomes necessary to cut out both of the filtering vessels.

The mode of operation of my invention is as follows: In the arrangement shown in Figs. 1 to 7, inclusive, single filtering may be produced—that is to say, fluid may be passed through one filtering medium only by dividing the flow between the two filtering vessels, the three-way cocks being turned in the position shown in Fig. 3. Double filtering—that is to say, causing the fluid to pass through both filtering vessels in series, beginning first with the left-hand tank 2 and then passing through the right-hand tank 1—may be produced by placing the three-way cocks in the position shown in Fig. 4. The reverse arrangement will of course produce double filtering, the fluid passing through the right-hand cylinder first and then through the left-hand cylinder or tank. Single filtering may be carried on through one of the tanks, as the left-hand tank 2, while the filter-bed in the right-hand tank is washed out by a reverse current of filtered water ultimately discharged through the waste connection 7 by placing the valves in the position shown in Fig. 5. Washing of the filter-bed in the left-hand tank while filtering is carried on in the right-hand tank may be produced by the reverse arrangement of valves. Both the filter-tanks may be cut out in case of leakage or where low pressure of water renders it advisable to temporarily dispense with the filtering operation by arranging the three-way cocks in the manner shown in Fig. 6. One of the tanks, as the right-hand one, may be cut out for purposes of refilling or repair while filtering is carried on through the left-hand tank by placing the valves in the position shown in Fig. 7. A reversed arrangement of valves would cut out the left-hand tank.

All of the above operations can be carried out in the modified arrangement shown in Fig. 8 by manipulation of the separate valves 17 to 24, so as to produce the same directions of flow above pointed out, with the exception of the cutting out of both filtering-tanks, in which case it becomes necessary to close all of the valves 17, 20, 21, and 24 and open the valve 26 in the by-pass 25.

The advantages of my invention comprise the variety of results which may be produced by the multiplication and assembling of similar units or parts, the ease of connecting and disconnecting any number of units, and the facility in absolutely cutting out any one of the filtering vessels from any connection whatever with the main portions of the system without interfering in any way with the operation of said remaining portions of said system.

It is evident, of course, that various changes could be made in the details of construction illustrated in the drawings and the proportion and location of parts, &c., without departing from the spirit and scope of my invention.

Having therefore described my invention, I claim—

1. In a filter system, the combination of two closed filtering vessels each provided with a filtering medium and a shunt-pipe forming a by-pass around said medium, three bridging-pipes connecting the two shunt-pipes, the middle one of said bridging-pipes being provided with a waste-discharge connection and controlling-valve therefor, and means for controlling the connections between the two outside bridging-pipes and the two shunt-pipes.

2. In a filter system, the combination of two closed filtering vessels each provided with a filtering medium and a shunt-pipe forming a by-pass around said medium, three bridging-pipes connecting the two shunt-pipes, the middle one of said bridging-pipes being provided with a waste-discharge connection and controlling-valve therefor and means for controlling the connections between the bridging-pipes and the two shunt-pipes.

3. In a filter system, the combination of two closed filtering vessels each provided with a filtering medium and a shunt-pipe forming a by-pass around said medium, three bridging-pipes connecting the two shunt-pipes, the middle one of said bridging-pipes being provided with a waste-discharge connection and controlling-valve therefor and means for controlling the connections between the bridging-pipes and the two shunt-pipes, said means comprising three-way cocks located at the junctions of the two outside bridging-pipes with the shunt-pipes.

4. In a filter system, the combination of two closed filtering vessels each provided with a filtering medium and a shunt-pipe forming a by-pass around said medium, three bridging-pipes connecting the two shunt-pipes, the middle one of said bridging-pipes being provided with a waste-discharge connection and controlling-valve therefor, and means for controlling the connections between the two outside bridging-pipes and the two shunt-pipes, together with a supply connection to one of the outside bridging-pipes, and a delivery connection to the other.

5. In a filter system, the combination of two closed filtering vessels each provided with a filtering medium and a shunt-pipe forming a by-pass around said medium, three bridging-pipes connecting the two shunt-pipes, the middle one of said bridging-pipes being provided with a waste-discharge connection and controlling-valve therefor and means for controlling the connections between the bridging-pipes and the two shunt-pipes, together with a supply connection to one of the outside bridging-pipes, and a delivery connection to the other.

6. In a filter system, the combination of two closed filtering vessels each provided with a filtering medium and a shunt-pipe forming a by-pass around said medium, three bridging-pipes connecting the two shunt-pipes, the middle one of said bridging-pipes being provided with a waste-discharge connection and controlling-valve therefor, and means for controlling the connections between the bridging-pipes and the two shunt-pipes, said means comprising three-way cocks located at the junctions of the two outside bridging-pipes with the shunt-pipes, together with a supply connection to one of the outside bridging-pipes, and a delivery connection to the other.

7. In a filter system, the combination of two closed filtering vessels each provided with a filtering medium and a shunt-pipe forming a by-pass around said medium, three bridging-pipes connecting the two shunt-pipes, the middle one of said bridging-pipes being provided with a waste-discharge connection and controlling-valve therefor, and means for controlling the connections between the two outside bridging-pipes, and the two shunt-pipes, together with a supply connection to one of the outside bridging-pipes, and a delivery connection to the other, a by-pass connection between the supply and delivery connections and a valve controlling said by-pass connection.

Signed at New York, N. Y., this 3d day of May, 1906.

GUY L. BAYLEY.

Witnesses:
 FRANK O'CONNOR,
 M. G. CRAWFORD.